US007085090B2

(12) United States Patent
Brume

(10) Patent No.: US 7,085,090 B2
(45) Date of Patent: Aug. 1, 2006

(54) SYSTEM, METHOD, AND APPARATUS FOR PROVIDING A SINGLE DISPLAY PANEL AND CONTROL FOR MULTIPLE DATA STORAGE DRIVES IN AN AUTOMATED DATA STORAGE LIBRARY

(75) Inventor: Shawn Owen Brume, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 10/627,070

(22) Filed: Jul. 25, 2003

(65) Prior Publication Data

US 2005/0018341 A1    Jan. 27, 2005

(51) Int. Cl.
    *G11B 15/18* (2006.01)
(52) U.S. Cl. .......................................... 360/69
(58) Field of Classification Search .................. 360/69, 360/99.02, 99.06, 98.04, 92; 345/212; 369/30.45; 414/273
    See application file for complete search history.

(56) References Cited

U.S. PATENT DOCUMENTS

| | | | |
|---|---|---|---|
| 4,024,505 A | | 5/1977 | Sperling |
| 4,142,215 A | | 2/1979 | Roberts |
| 5,644,705 A | | 7/1997 | Stanley |
| 5,757,365 A | * | 5/1998 | Ho .............................. 345/212 |
| 5,870,630 A | | 2/1999 | Reasoner et al. |
| 6,262,863 B1 | * | 7/2001 | Ostwald et al. ................ 360/92 |
| 6,480,759 B1 | | 11/2002 | Ostwald et al. |
| 6,639,879 B1 | * | 10/2003 | Plutt et al. ................ 369/30.45 |
| 6,808,353 B1 | * | 10/2004 | Ostwald et al. ............. 414/273 |
| 6,816,331 B1 | * | 11/2004 | Porter et al. ................... 360/69 |
| 2003/0030926 A1 | | 2/2003 | Aguren et al. |

FOREIGN PATENT DOCUMENTS

| | | |
|---|---|---|
| JP | 6035614 A | 2/1994 |
| JP | 11353761 A | 12/1999 |
| JP | 11353762 A | 12/1999 |

OTHER PUBLICATIONS

"Random Access Tape Library Family IBM AS 400", Intelligent tape libraries for IBM iSeries (AS/400), high capacity random access autoloader, Avax International, webmaster@avax.com, pp. 1-2.

(Continued)

*Primary Examiner*—William Klimowicz
*Assistant Examiner*—Fred F. Tzeng
(74) *Attorney, Agent, or Firm*—Dale M. Crockatt; Dillion & Yudell LLP

(57) ABSTRACT

A system for providing a single display for control of multiple data storage drives in an automated library incorporates a switching unit that allows the different drives to be displayed on the single display unit. The drives are mounted in a frame and connected to the display. A connection and switching mechanism and microcode are used to attach and control the drives with the display. The switching mechanism controls the drive that is currently displayed on the display unit. The operations panel and the switching mechanism fit into an existing frame without modification. When a user selects one of the drives through the operations panel, the operations panel controls the drive without having to switch physical connections.

5 Claims, 6 Drawing Sheets

OTHER PUBLICATIONS

ATL 4/48 Library and ATL 2/24 Library —Intelligent Solutions, www.intel-sol.com/products/dlt/atl448.html+ATL . . . , pp. 1-4.

Docs.sun.com—Sun Product Documentation, Sun VTS 5.0 Test Reference Manual, pp. 1-6.

* cited by examiner

SYSTEM, METHOD, AND APPARATUS FOR PROVIDING A SINGLE DISPLAY PANEL AND CONTROL FOR MULTIPLE DATA STORAGE DRIVES IN AN AUTOMATED DATA STORAGE LIBRARY

BACKGROUND OF THE INVENTION

1. Technical Field

The present invention relates in general to an improved automated tape drive library and, in particular, to an improved multi-drive, single display panel control for a frame in an automated tape drive library.

2. Description of the Prior Art

Data storage drives, such as data tape drives, record information to and read information from media, such as the data tape of a tape cartridge. Data storage drives are often used in conjunction with, for example, a data storage and retrieval system. One example of such a system is an automated data storage library with robotic picking devices, wherein removable media cartridges are selectively transported between storage cells and data storage drives in an automated environment. Herein, automated data storage library, data storage library, data storage and retrieval system, and library may all be used interchangeably.

Once requested, data that is stored on data storage media of an automated data storage library typically is needed quickly. Thus, it is desirable that an automated data storage library be maintained in an operational condition on a continuous basis as much as possible. As a result, user expectations have moved toward a concept of continuous availability, such as the well-known "24×7×365" availability. In order to maintain continuous availability of data, the data storage drives are individually "hot-pluggable" into and out of the various modules or frames of the library.

In current libraries, each of the data storage drives comes equipped with its own independent controls and dedicated display device for monitoring the status of the drive. Such conventional systems have a single input/output plug that is connected to a display unit for individual control of the drive. The control panel is identified with the individual drive and controls only the features of that drive. A control panel holder is attached to the drive in the front of the drive. This position is ultimately located inside of the library frame and is not visible or controllable without opening the door of the library. The purpose of this control panel is to serve as a point of control for setting up the drive to be used in different environments, for use by customers and service technicians for determining and correcting problems with the drive, as well as for other proprietary functions used only by the service technicians. Although this design is workable, an improved system, method, and apparatus for providing a single display for control of multiple data storage drives in a frame of an automated data storage library would be desirable.

SUMMARY OF THE INVENTION

One embodiment of a system, method, and apparatus for providing a single display for control of multiple data storage drives in one frame of an automated data storage library is disclosed. The present invention incorporates a switching unit that allows all of the controls and operations for the different drives to be displayed on a single display unit. Such a design centralizes the management of the drives and reduces user fatigue when dealing with multiple drives.

The multiple drives are mounted in a frame and connected to a single control display, such as a liquid crystal display (LCD). A connection and switching mechanism and microcode are used to allow all of the drives to be attached to and controlled by the single display. From this single point of control, the user is able to control all of the functions associated with the drive control features. These include, but are not limited to setting library control features, microcode enhancements, retrieval of microcode dumps, and accessing all vital product data. The display is also used for simple function of the drives such as loading and unloading cartridges, resetting the drives (causing the drive to power off, then back on), setting error code match dumps, and looking at drive history for loads and power-on time. In addition, the display provides a single point of access to the individual drives to monitor any potential problems with the drives. As a result, these drives can determine potential problems in their operation prior to actual failure. These determinations are posted to the display as error messages.

The single point of access to the drives also allows the customer to check all of the drives for posted errors without going to each drive. For example, the touch screen may be used in the library to select a specific one of the drives. The single display controls the drives in the same manner as conventional, dedicated displays. When a two-for-one drive solution (a design that allows two drives to fit in the same space that was previously required for a single drive) is placed into a library, it is installed with, for example, twelve drive connection cables (one per drive) that extend to the switching mechanism. The switching mechanism controls which drive is being controlled by the operations panel of the display. The operations panel and the switching mechanism are designed to fit into an existing frame without modification. When a user selects one of the drives through the operations panel, the operations panel controls the drive without having to switch physical connections.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
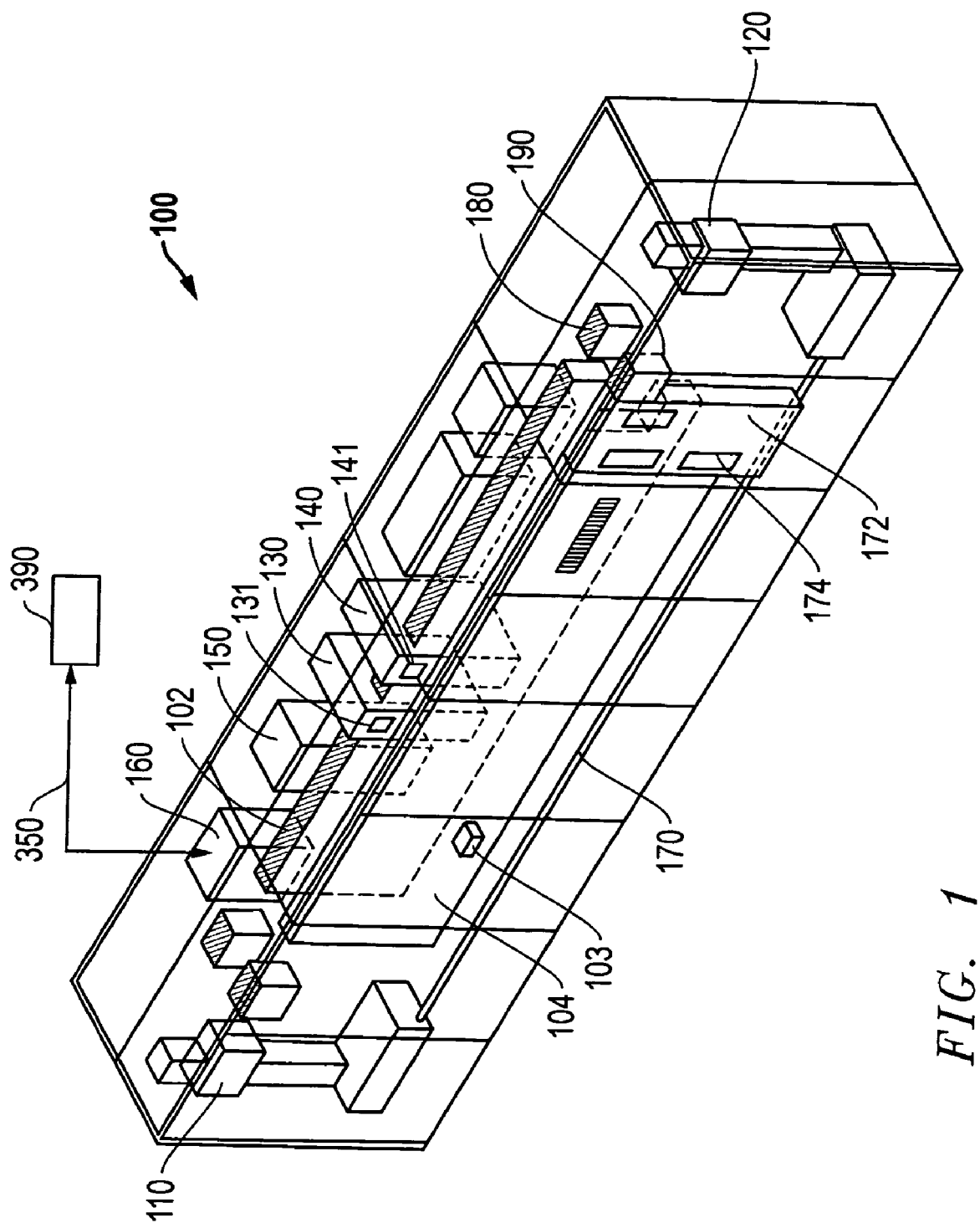
FIG. 1 is an isometric view of one embodiment of a data storage and retrieval system constructed in accordance with the present invention.

Referring to FIG. 1, a data storage and retrieval system 100 is shown. In the embodiment illustrated, data storage and retrieval system 100 is depicted as a robotic library. The upper interface of controller 160 allows data storage and retrieval system 100 to communicate with one or more hosts 390 via link 350. Link 350 may comprise an Ethernet, Infiniband, TCP/IP, Fibre Channel-Arbitrated Loop, SCSI, ESCON, FICON, or the like, depending on the application. The lower interface of controller 160 communicates with a plurality of drives that are positioned in drive enclosures 130 and 140. Drive enclosures 130 and 140 receive removable media cartridges 103, via robotic pickers 110 and 120. The removable media cartridges 103 may contain magnetic tape, optical tape, optical disk media, magneto-optical disk, CD, DVD, phase-change media, floppy disk, removable hard disk, electronic media, and the like. Robotic pickers 110 and 120 travel along rail 170 to move removable media cartridges 103 from inner storage wall 102 and outer storage wall 104 to drive enclosures 130 and 140 for the purposes of reading and/or writing data. Robotic pickers 110 and 120 also return the removable media cartridges 103 to storage walls 102 and 104.

An import/export station 172 includes access door 174 attached to the side of data storage and retrieval system 100. Access door 174 is preferably pivotally attached to the side of data storage and retrieval system 100; however, access door 174 could be slidably or otherwise attached. An operator panel or access station 150 permits a user to communicate directly with data storage and retrieval system 100. The operator access station 150 typically contains an LCD display, a keyboard or touch screen for user input, and circuits to monitor and control the I/O station doors.

First power component 180 and second power component 190 each comprise one or more power supplies that supply power to pickers 110 and 120, controller 160, operator access station 150, and drive enclosures 130 and 140 of data storage and retrieval system 100. Typically, at least one of the power components 180 and 190 provides direct current (DC) power, since most computer peripheral devices use DC power. One of the power components 180 and 190 may provide alternating current (AC) power as well. Controller 160 is in communication with power components 180 and 190, pickers 110 and 120, operator access station 150, drive enclosures 130 and 140, and data storage drives of data storage and retrieval system 100.

Figure 2:
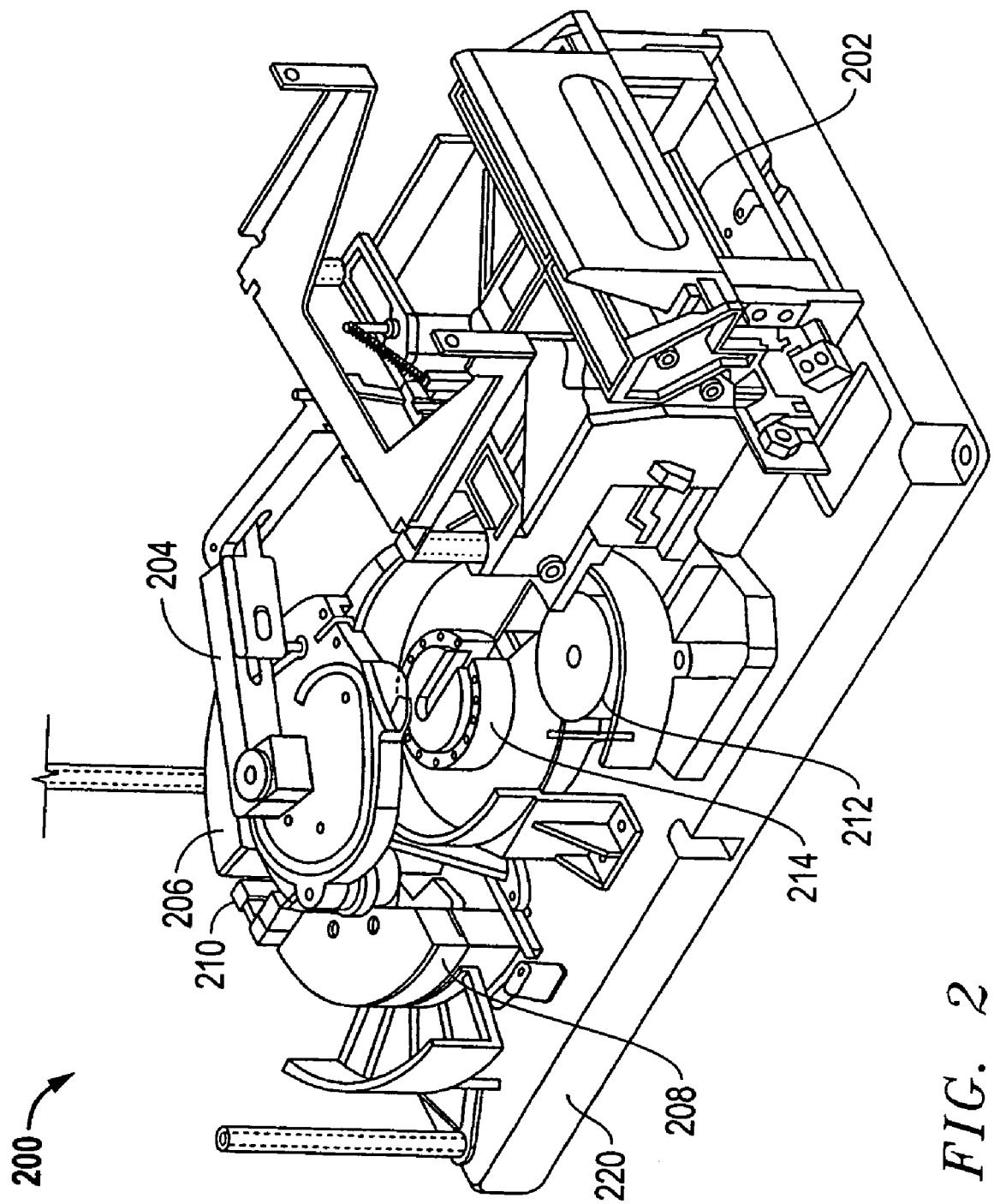
FIG. 2 is an isometric view of a tape drive utilized by the data storage and retrieval system of FIG. 1.

Referring now to FIG. 2, a typical reel-to-reel tape drive 200 is shown. As described above, any removable media data storage drive may be used, such as tape drives, optical and magnetic disk drives, electronic media drives, or any other drives and media as is known to those skilled in the art. A plurality of drives 200 is usually located inside of the library 100 of FIG. 1. Tape drive 200 may be any one of, for example, a family of tape drives using a single-reel tape cartridge, such as the IBM 3480, IBM 3490, IBM 3590, Digital Linear Tape (DLT), and Linear Tape Open (LTO) tape drives. Cartridge loader 202 receives a single-reel tape cartridge and a threader threads the leader-block of the tape around the tape guides 206 and 208, and around the tape tension transducer 212, and into the take-up reel 214. Tape guides 206 and 208 support the tape as the tape moves over the magnetic tape head 210. All of these components are supported by base plate 220. One or more tape drives 200 are located inside drive enclosures 130, 140 (FIG. 1) in order to protect the tape drives 200 from dust and debris, as well as extraneous air currents that could disturb the way the magnetic tape passes over the magnetic head 210.

Figure 3:
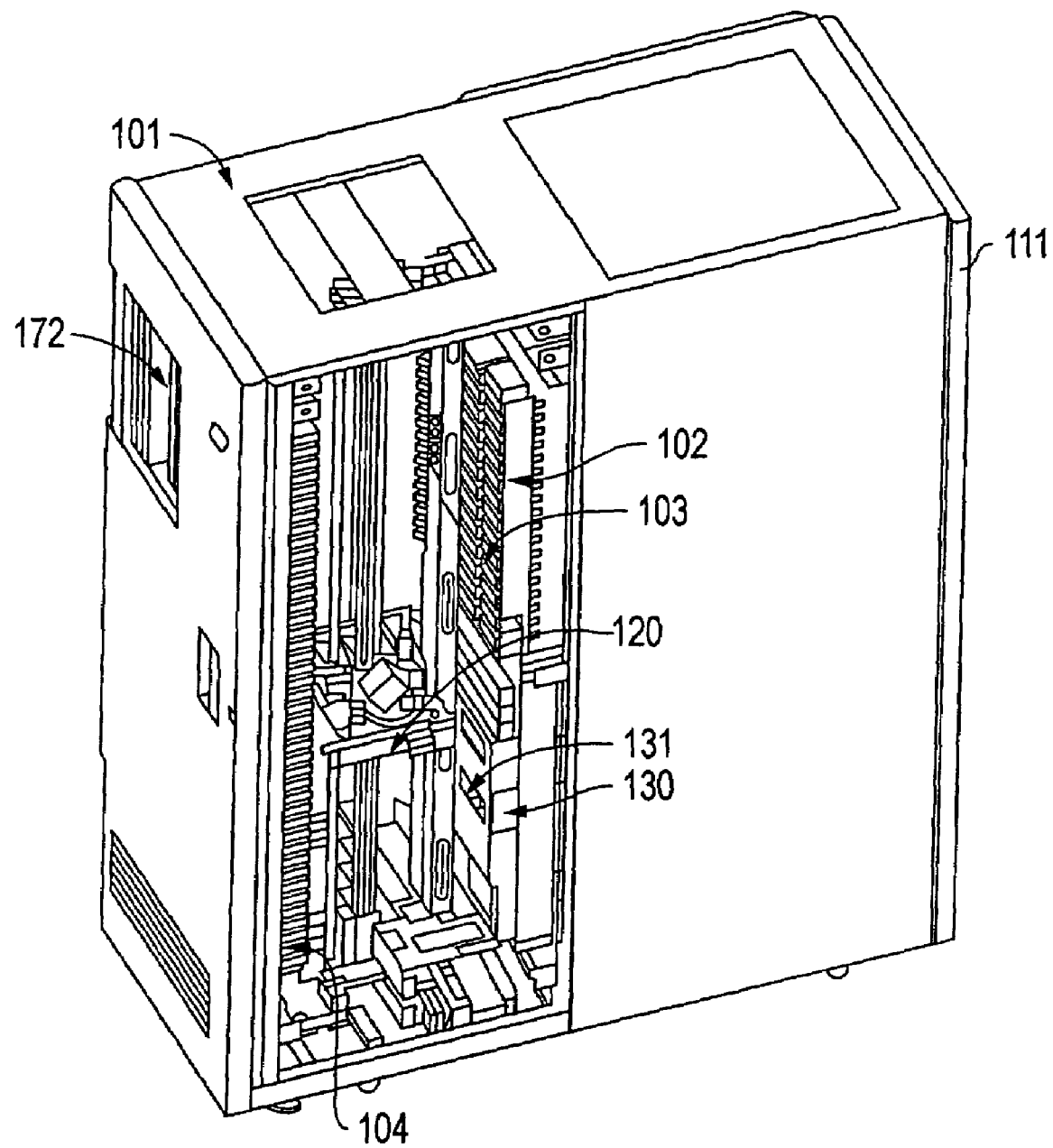
FIG. 3 is an isometric view of a storage module utilized by the data storage and retrieval system of FIG. 1.
Figure 4:
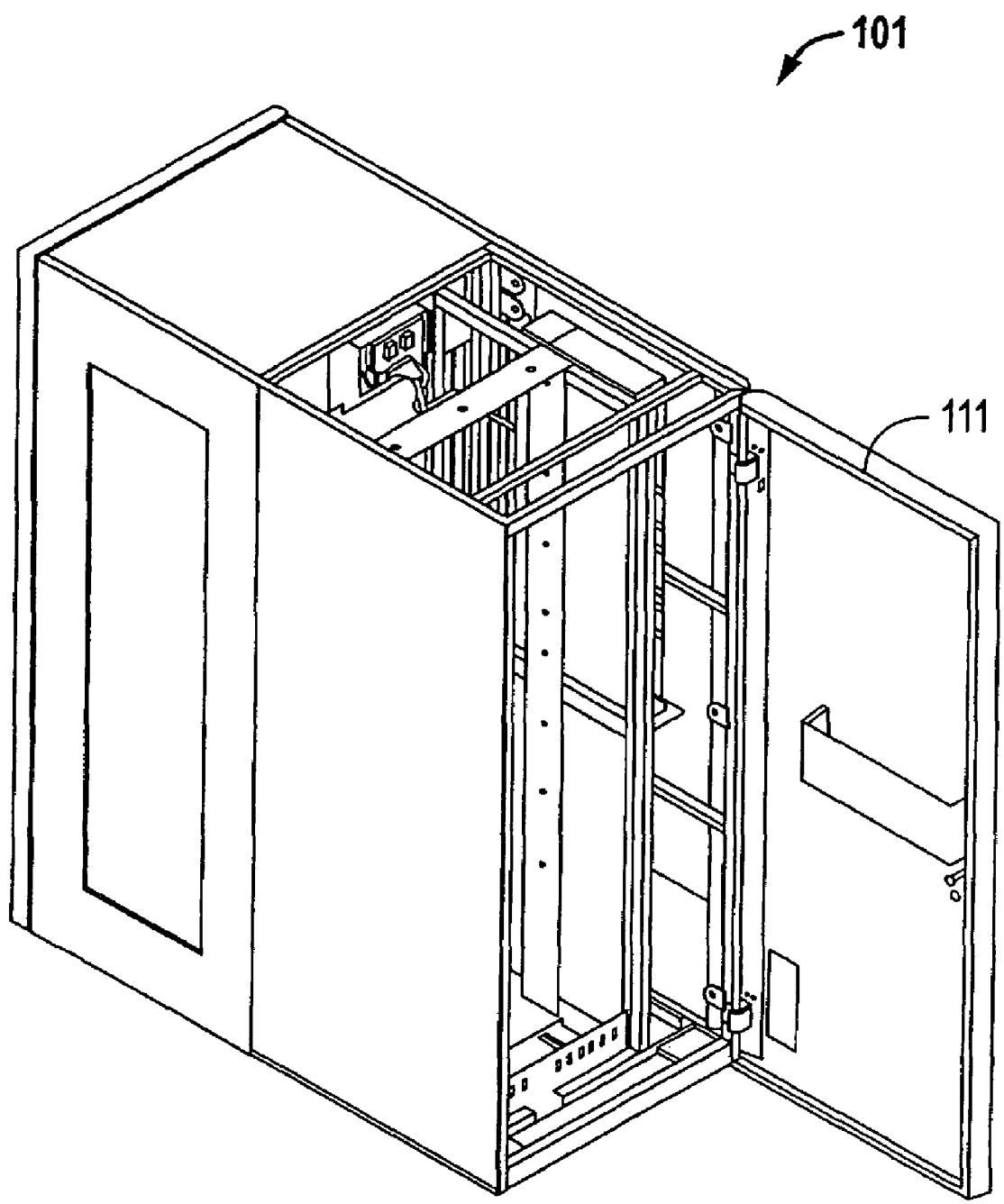
FIG. 4 is a reverse isometric view of the storage module of FIG. 3 with the rear door in an open position.

The data storage and retrieval system 100 of FIG. 1 is typically assembled from a series of frames or storage modules 101, such as the L-frame type storage module illustrated in FIGS. 3 and 4. A storage module is an expansion component of the library. Frames, accessors, magazines, etc. may comprise examples of storage modules. The storage module may comprise one or more of the following; one or more storage shelves for holding data storage media, one or more data storage drives for reading and/or writing data on the data storage media, one or more import/export stations for operator access to the data storage media, one or more accessors for moving the data storage media to/from data storage drives and storage shelves, one or more frames or compartments for holding additional storage modules or library components. Storage module 101 also has a rear door 111 shown in a closed position (FIG. 3) and an open position (FIG. 4).

In the example of FIG. 1, the desired number of storage modules 101 are assembled into data storage and retrieval system 100. Storage module 101 comprises a picker 120, a drive enclosure 130, an inner storage wall 102, and an outer storage wall 104. A plurality of removable storage media 103 is located in each storage wall 102, 104. In this example, removable storage media 103 comprises tape cartridges, but may also comprise other types of media such as those described above. Removable storage media 103 are inserted via robotic pickers 110, 120 into drive enclosures 130, 140 via entrances 131, 141, respectively, where removable storage media 103 are mounted inside the data storage drive, such as tape drive 200 (FIG. 2) or a data storage drive. Each picker 110, 120 includes a gripper assembly having a bar code scanner for reading cartridge labels, or other means for identifying the cartridges.

Figure 5:
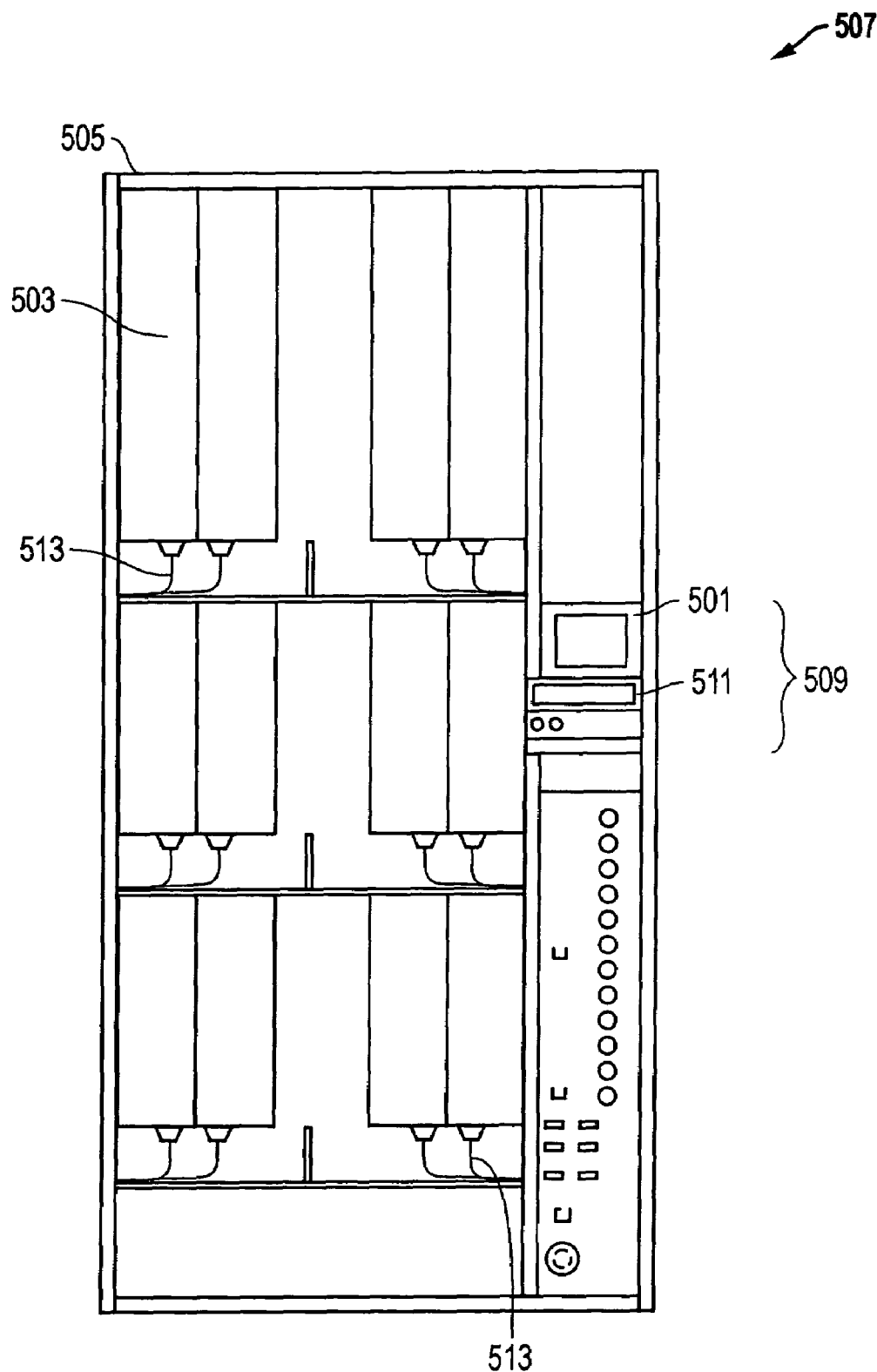
FIG. 5 is a rear view of the storage module of FIG. 3.
Figure 6:
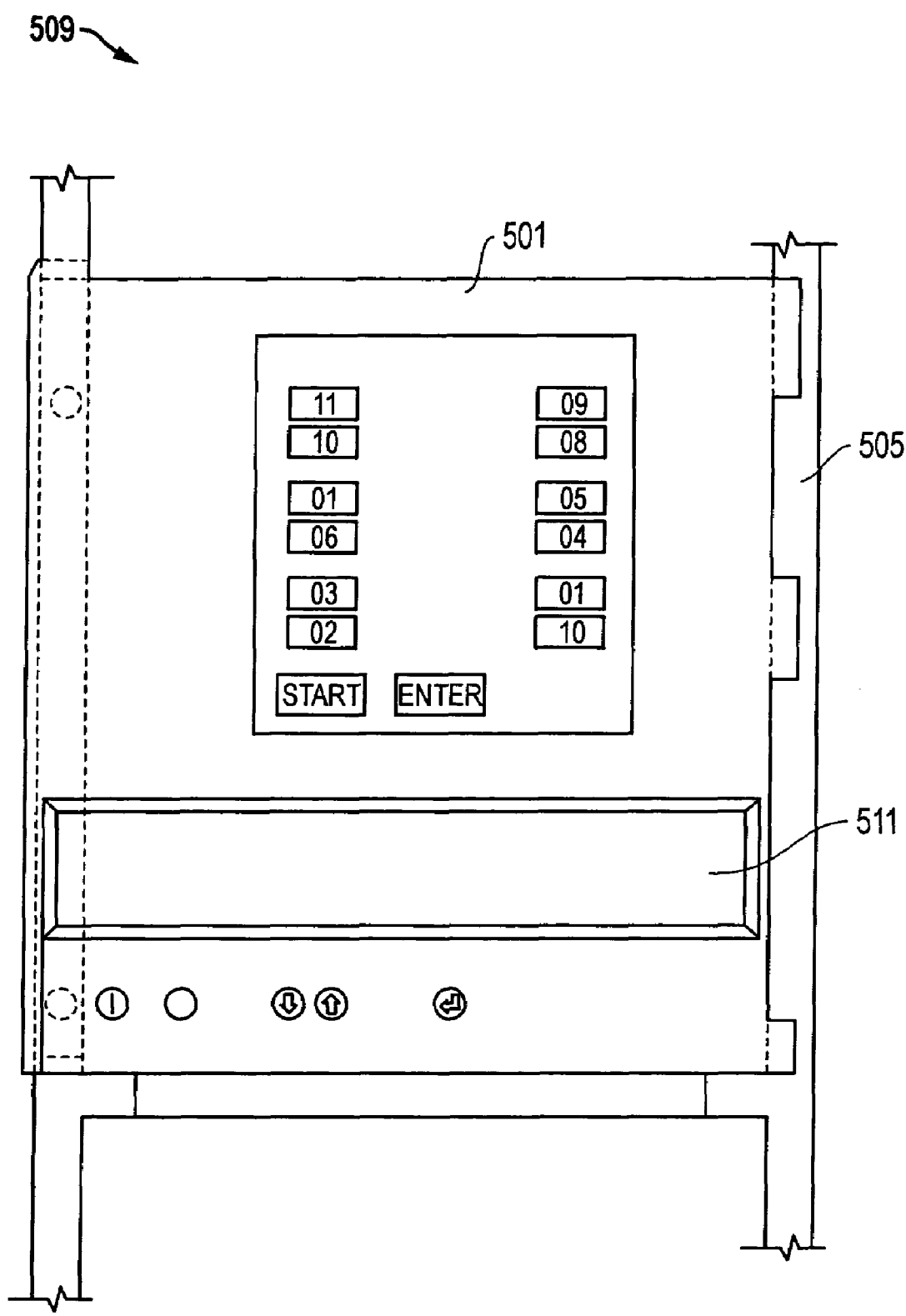
FIG. 6 is an enlarged rear view of a single control panel for all of the data storage drives located in the storage module of FIG. 3.

Referring now to FIGS. 5 and 6, one embodiment of a system, method, and apparatus for providing a single display 501 for control of multiple data storage drives 503 in one frame 505 of an automated data storage library 507 is disclosed. The automated data storage library 507 comprises one or more frames 505 (one shown), each of which has a plurality of data storage drives 503 (twelve shown) mounted thereto. The automated data storage library 507 may comprise a plurality of frames 505, with each of the frames 505 having a plurality of the data storage drives 503, and a single display 501 associated with and mounted to each of the frames 505. As described above for the previous FIGS. 1–4, a robotic picker 110, 120 is provided for accessing different ones of the data storage drives 503 via data tape cartridges 103.

A single control station 509 is associated with and mounted to existing space in the frame 505 without a need for modifying the frame 505. The single control station 509 is provided for controlling all of the data storage drives 503 in the frame 505 from a single position. In one embodiment, the single control station 509 further comprises a single display device 501, such as a liquid crystal display unit, for touch-screen, operational control of all functions of all of the data storage drives 503 for centralizing management of all of the data storage drives 503. A switching unit 511 is connected to the single display device 501 for manipulating selection of the data storage drives 503 via microcode at the drive and switching unit level. This system may or may not utilize its own central processing unit (CPU).

The data storage drives 503 in the automated data storage library 507 have a variety of functions. All of the operations and functions provided by the data storage drives 503 are controlled by the single control station 509. These functions comprise loading and unloading the data tape cartridges 103, resetting the data storage drives 503, setting error code match dumps, looking at drive history for loads and power-on time, setting library control features, microcode enhancements, retrieval of microcode dumps, accessing all vital product data, and monitoring potential problems with the data storage drives 503. Moreover, the data storage drives 503 determine potential operational problems prior to actual failure, and these determinations are posted to the single display device 501 as error messages. As shown in FIG. 5, the data storage drives 503 may be installed in the frame 505 in a two-for-one drive solution, with individual drive connection cables 513 extending between each data storage drive 503 and the switching unit 511.

In operation, the present invention also comprises a method of operating the automated data storage library 507. The method comprises providing a frame 505 having a plurality of data storage drives 503 and a single control station 509. The method also includes controlling all of the data storage drives 503 in the frame 505 with the single control station 509. The method further comprises performing touch-screen, operational control of all functions of all of the data storage drives 503 with a single display device 501 to centralize management of all of the data storage drives 503, and manipulating selection of the data storage drives 503 via microcode and a switching unit 511 that is connected to the single display device 501.

As described above, the performing step comprises loading and unloading cartridges 103, resetting the drives 503, setting error code match dumps, looking at drive history for loads and power-on time, setting library control features, making microcode enhancements, retrieving microcode dumps, accessing all vital product data, and monitoring potential problems with the data storage drives 503. The method further comprises determining potential operational problems of the data storage drives 503 prior to actual failure, and posting these determinations to the single display device 501 as error messages.

The method still further comprises installing the data storage drives 503 in the frame 505 in a two-for-one drive solution, with individual drive connection cables 513 extending between each data storage drive 503 and the switching unit 511. In addition, the method further comprises providing a plurality of frames 505 with each of the frames 505 having a plurality of the data storage devices 503, and a single display device 501 associated with each of the frames 505 to define a plurality of the single display devices 501.

The present invention has several advantages including the ability to control multiple data storage drives in an automated data storage library from a single display in one location. This design reduces user fatigue when dealing with multiple drives and also centralizes the management of the drives. The operations panel and the switching mechanism are designed to fit into an existing frame without modification. When a user selects one of the drives through the operations panel, the operations panel controls the drive without having to switch physical connections. The present invention solves the problem of needing multiple displays at the back of the library. Rather than provide one display panel for each drive unit, one centralized, interconnected display is provided in each frame with the ability to select the desired drive from a single location.

While the invention has been shown or described in only some of its forms, it should be apparent to those skilled in the art that it is not so limited, but is susceptible to various changes without departing from the scope of the invention.

What is claimed is:

1. An automated data storage library, comprising:
   a plurality of storage modules, said plurality of storage modules comprising
     a storage frame module,
     a storage shelf module to removably store data storage media, and
     an accessor module;
   a plurality of storage drives disposed within said storage frame module, wherein said accessor module comprises a robotic picker to transport said data storage media between said storage shelf module and said plurality of storage drives;
   a control station, disposed within said storage frame module and coupled to each of said plurality of storage drives, to control operation of said plurality of storage drives from a single position, said control station comprising
     a display device configured to display a graphical representation of said plurality of drives and to receive a touch screen selection input utilizing said graphical representation, wherein said touch screen selection input specifies a selected storage drive of said plurality of storage drives, and
     a switching element configured to communicatively couple said display device to said selected storage drive in response to a receipt of said touch screen selection input.

2. The automated data storage library of claim 1, wherein said display device is further configured to display status data associated with said selected storage drive in response to a receipt of said touch screen selection input.

3. The automated data storage library of claim 1, wherein at least one of said plurality of storage drives is configured to detect a potential operational problem prior to a failure of said at least one of said plurality of storage drives, and said display device is further configured to display an error message in response to a detection of said potential problem.

4. The automated data storage library of claim 1, wherein said display device is further configured to receive a control input, and
   said control station is further configured to cause said selected storage drive to perform a requested operation in response to a receipt of said control input.

5. The automated data storage library of claim 1, further comprising
   a controller communicatively coupled between said storage frame module and a host data processing system.

* * * * *